Aug. 12, 1969   R. W. SPEISER ET AL   3,460,350
IRRIGATION APPARATUS
Filed May 24, 1965
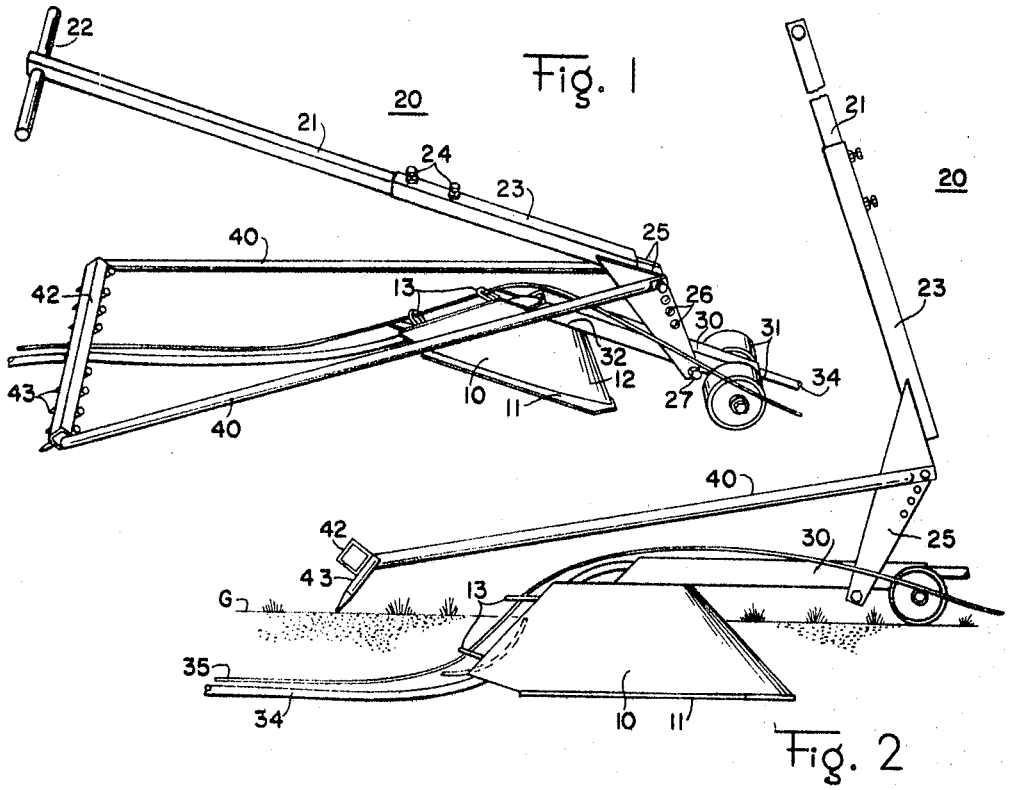
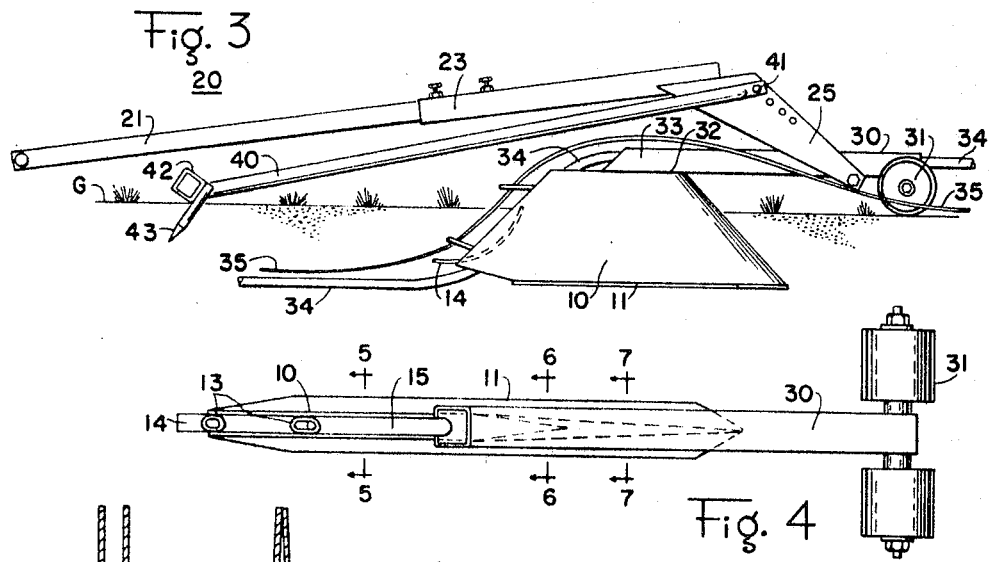
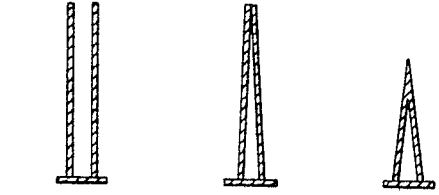
INVENTOR.
RALPH W. SPEISER
WILLIAM C. LINDQUIST
BY Vernon A. Johnson
ATTORNEY

United States Patent Office 3,460,350
Patented Aug. 12, 1969

3,460,350
IRRIGATION APPARATUS
Ralph W. Speiser and William C. Lindquist, Minneapolis, Minn., assignors to Toro Manufacturing Corporation, Minneapolis, Minn., a corporation of Minneosta
Filed May 24, 1965, Ser. No. 457,942
Int. Cl. E02f 5/02; A01b 3/02
U.S. Cl. 61—72.6      5 Claims

ABSTRACT OF THE DISCLOSURE

A machine for laying flexible pipe underground comprising a trenching blade through which the pipe is fed to the trench formed by the blade, a ground traversing frame supporting the blade, a handle having a hand grip on one end and pivotally mounted on the frame at its other end and a ground engaging lever pivotally connected to the handle intermediate its ends. To move the blade through the ground, the free end of the lever is anchored in the ground, the other end of the lever then providing a fixed pivot point or fulcrum about which the handle pivots. The grip end of the handle is then pulled down, the other end of the handle pivoting about the lever and propelling the frame and blade forwardly.

---

This invention pertains to the art of installing irrigation systems, and more particularly, to apparatus for simultaneously trenching, installing and covering the flexible pipe commonly used for underground irrigation and sprinkling systems.

In recent years, it has become prevalent to use non-metal pipe for underground irrigation and sprinkling systems instead of the more conventional metal pipes previously in widespread use. This change has resulted from continued improvement in the polyethylene and polyvinyl chloride (PVC) pipes used for this purpose, and there is every indication that non-metal pipes will be used with greater frequency in future underground situations in view of the generally lower cost and greater durability offered thereby.

In many such installations, and especially the installation of extended systems such as found on large estates or golf courses, it is common to install the pipe—whether flexible or rigid—by using a trenching machine such as shown in United States Patent 2,979,837 to dig a complex of narrow ditches in which the lengths of pipe are laid and coupled. The trenches are later filled after the system has been fully installed. This, of course, leaves a scar on the turf which must be either sodded or seeded in order to restore the area to its original appearance.

However, this system of installation is unduly cumbersome and troublesome when used for the installation of the relatively simple flexible-pipe automatic underground-sprinkling-systems now available for residential applications, and has been found to substantially—and in some cases prohibitively—increase the total cost of putting such a system into residential operation.

Our invention eliminates many of the problems of installing the relatively small sprinkling systems that utilize flexible pipe, by simultaneously trenching the turf and burying the pipe, and by eliminating the need for backfilling the trench created during the operation. Furthermore, this invention lends itself to convenient use by the homeowner, permitting him to install the system himself and thereby minimize his total cost.

Thus, it is the object of our invention to provide a relatively simple, hand operated apparatus, for simultaneously trenching the turf and burying flexible pipe, without creating an open ditch requiring subsequent backfilling.

A further object of the invention is to provide such an apparatus in which one or more flexible hydraulic or pneumatic control tubes of small diameter may be simultaneously buried with the main pipe.

These and other objects of our invention will become apparent from a reading of the following description, in the light of the drawings, in which:

FIGURE 1 is a side perspective view of our pipe laying apparatus, without reference to ground.

FIGURE 2 is a side elevation of the apparatus shown in normal use in the ground with the handle in its forward position, FIGURE 3 is a side elevation of the apparatus shown in normal use in the ground, but with the handle it its rearward position, FIGURE 4 is a top view of a portion of our apparatus including the plow blade, and FIGURE 5, 6 and 7 are cross-sectional views of the plow blade as viewed at the correspondingly numbered section lines shown on FIGURE 4.

The invention, briefly summarized, includes a hollow trenching blade through which flexible pipe is fed downwardly from the ground surface to the trench formed by the blade as the blade is moved forwardly. The blade is carried by a ground traversing frame, to which one end of a manually operable handle is pivotally mounted. The handle carries a rearwardly extending lever, the front end of which is pivotally attached to the handle, the rear end of which is provided with tines for anchoring the lever in the ground. To lay the pipe, the blade is installed in the ground. The pipe is layed out on the ground along the path of installation and the free end of the pipe is installed in the hollow portion of the blade. The blade is then propelled forwardly by first anchoring the lever tines in the ground and then pulling down on the handle against the resistance of the lever the forward end of which functions as a fulcrum. The movement of the blade causes a trench to be dug, and the pipe to be fed into said trench. The handle is then raised, causing the tines to disengage from the ground, and intermittent movement is continued by repetition of the aforementioned anchoring of the tines and lowering and raising of the handle.

Our apparatus consists of a plow blade 10, having a flange 11 welded across the bottom as shown. The blade 10 is formed of two plates, which are welded together at their leading edges, and then sharpened to provide a common sloped cutting edge 12. The shape of this blade is best seen in the several cross-sectional views, FIGURES 5, 6 and 7. Two elongate rings 13 are welded between the plates at the rear to act as guides for control tubing 35, and a curved insert 14 is welded between the plates of blade 10 as shown to act as a guide for pipe 34.

A hollow drawbar member 30 is welded at its rearward end to the top edge 32 of blade 10 as shown, and is welded at its forward end to the axle of wheel assembly 31. Thus, the rear portion of drawbar 30, rings 13, insert 14, flange 11, and the two sides of blade 10 form a semi-enclosed hollow structure having an opening 15 through which flexible pipe 34 is extended as shown in FIGURES 1, 2 and 3. In operation, the pipe 34 is laid out on the ground along the desired path, and one end of the pipe 34 is fed through the forward end of drawbar 30, then out of the rear opening 33 of drawbar 30 and downwardly through opening 15, and then to the rear past the trailing end of insert 14 as shown. Thereafter, when blade 10 is pulled through the turf in the manner to be described below, and assumes a constant depth with respect to ground line G, pipe 34 is laid in the ground below the trailing edge of insert 14 as shown. The turf that is sliced and slightly lifted by blade 10 as the pipe is being installed, naturally falls back in place and closes behind the plow, and the concealment is often so effective that it is difficult to detect the line of installation. We have also found that the concealment is substantially enhanced by pulling a small roller behind our apparatus (not shown), and especially when the roller has a platform on which the operator can stand to enhance the covering of the pipe, and to firmly compact the soil as the blade 10 is pulled forward through the ground.

Simultaneously as pipe 34 is installed, one or more control tubes 35 may be installed in the same trench. Small control tubes, for either hydraulic or pneumatic control, are conventionally used for automatic systems, and must be extended from the main controller to the remote valves. Our invention readily lends itself to the installation of such tubes. One tube 35 is shown in the drawings, although several could be used. They are laid out adjacent pipe 34, and extended downwardly through loops 13 as shown. Thus, as blade 10 moves forward through the turf, control tubes 35 are laid adjacent to pipes 34 as shown, at a relatively constant and predetermined depth.

The apparatus for drawing blade 10 through the ground consists of handle assembly 20 and a foot drag assembly including pivot arms 40, as will now be described. Handle 20 consists of a handgrip 22 fastened to upper telescoping shaft 21, and lower telescoping shaft 23 is held in lengthwise adjustable relation thereto by setscrews 24. The lower end of shaft 23 is welded between matched parallel brackets 25, having a plurality of aligned holes 26 formed therein. The lower end of each bracket 25 is pivotally attached to drawbar 30 by means of pin 27 which passes through a short sleeve (not shown) welded to the underside of drawbar 30. Thus, as handgrip 22 is moved up and down, the entire handle assembly 20 pivots on drawbar 30 at pin 27.

The foot drag assembly consists of arms 40 pivotally attached at their forward ends on opposite sides of bracket 25 by pin 41. The rearward ends of pivot arms 40 are welded to foot bar 42, which in turn has a plurality of ground engaged tines 43 welded thereon as shown.

In operation, handle assembly 20 is moved to the position shown in FIGURE 2 causing the foot drag including tines 43 to be easily drawn forward over the surface of the ground while the blade 10 remains stationary in the ground. Then, handle assembly 20 is pulled rearwardly, initially causing tines 43 to become buried in the turf, and stepping on foot bar 42 is often necessary to initially assist tines 43 into the turf. Thereafter, further rearward and downward movement of handle assembly 20 causes it to pivot on the relatively fixed axis of pin 41, and the lower ends of brackets 25 are thereby caused to move forwardly with respect to the ground, and blade 10 is correspondingly drawn through the soil. Thus, by successive operations or pumps of handle assembly 20, the blade 10 is moved forwardly in regular increments, causing corresponding successive lengths of pipe 34 and tubing 35 to be buried at a predetermined depth.

In the configuration shown, each pump of handle assembly 20 causes blade 10 to move forward the maximum distance, which in practice has been preferably determined to be approximately 18 inches. However, by moving pivot pin 40, and the forward ends of pivot bars 41 to the succeeding holes 26 in brackets 25, the mechanical advantage is increased, but the distance traversed per pump is correspondingly reduced. This adjustment feature makes it possible to more readily use the device in turf that is quite dry and firm, although we have found it desirable in such cases to premoisten the soil and thereby speed up the entire operation by operating with maximum stroke.

While there has been described what is at present considered to be the preferred embodying of this invention, it will be obvious to those skilled in the art that various changes and modifications may be made therein without departing from the invention and it is, therefore, aimed in the appended claims to cover all such modifications as fall within the true spirit and scope of the invention.

What is claimed is:

1. A hand operated device for continuously burying flexible elongate members in a concealed trench, comprising:
   a plow member having an upwardly and rearwardly sloping sharpened forward edge and a horizontally disposed laterally projecting bottom plate,
   a wheeled frame attached to said plow member,
   a handle pivotally attached to said frame and vertically swingable forwardly and rearwardly relative thereto,
   a laterally extending anchoring member having laterally spaced downwardly and rearwardly oriented tine means,
   and lever members disposed laterally of opposite sides of said plow member and attached to the lateral end portions of said anchoring member, said lever members converging toward and pivotally attached to said handle whereby rearward movement of said handle urges said tines into anchoring engagement with the ground and effects forward movement of said frame and plow member,
   and guide means at the rearward extremity of said plow member for guiding said elongate members from the surface of the ground to a concealed position in the trench formed by said plow member.

2. The device of claim 1, wherein said plow member includes spaced apart side walls defining a space therebetween for the passage of said elongate members through said plow member,
   said plow member having an opening at the top thereof for admitting said elongate members to said space and a rearwardly facing opening for discharging said elongate members from said space to the trench formed by said plow,
   said guide means providing a curved path of travel for said elongate flexible members through said plow member.

3. The device of claim 2, including ring means extending rearwardly of said plow member for receiving elongate flexible members and guiding them from the surface of the ground to a concealed position in the trench formed by said plow member.

4. The device of claim 1, wherein said frame includes a tubular member open at both ends and attached to the upper portion of said plow and extending forwardly therefrom,
   ground engaging wheels supported by said tubular member,
   said elongate flexible members passing through said tubular member.

5. A hand operated device for continuously burying flexible elongate members in a concealed trench, comprising:
   a plow member having an upwardly and rearwardly sloping sharpened forward edge and a horizontally disposed laterally projecting bottom plate, and spaced apart side walls defining a space therebetween for the passage of said elongate flexible members through said plow member,
   said plow member also having an opening at the top thereof for admitting said elongate members to said space and rearwardly facing opening for discharging said elongate members from said space to the trench formed by said plow.
   said guide means providing a curved path of travel for said elongate flexible members through said plow member,
   a wheeled frame attached to said plow member including a tubular member open at both ends and attached to the upper portion of said plow member and extending forwardly therefrom, said flexible members passing through said tubular member and emerging therefrom adjacent the top opening in said plow member, a handle pivotally attached to said frame and vertically swingable forwardly and rearwardly relative thereto, an elongate anchoring member disposed transversely of the direction of travel and having a plurality of tines extending downwardly and rearwardly therefrom, and a pair of lever arms attached to opposite end portions of said anchoring member and pivotally attached to said handle whereby rearward movement of said handle urges said tines into anchoring engagement with the ground and effects forward movement of said frame and plow member.

References Cited

UNITED STATES PATENTS

| | | | |
|---|---|---|---|
| 2,428,188 | 9/1947 | Williams | 172—352 |
| 781,568 | 1/1905 | Stevens | 61—72.6 |
| 2,624,938 | 1/1953 | Davis | 172—13 X |
| 3,058,530 | 10/1962 | Keinath | 172—13 |
| 3,066,491 | 12/1962 | Ryan | 61—72.6 |

FOREIGN PATENTS

| | | |
|---|---|---|
| 476,899 | 6/1915 | France. |
| 1,102,231 | 3/1961 | Germany. |
| 547,318 | 8/1942 | Great Britain. |
| 207,353 | | Australia. |

EARL J. WITMER, Primary Examiner

U.S. Cl. X.R.

172—352